United States Patent
Bonazza et al.

(10) Patent No.: US 11,543,794 B2
(45) Date of Patent: Jan. 3, 2023

(54) METHOD AND APPARATUS FOR BOXING ICE CREAM TYPE PRODUCTS

(71) Applicant: CT PACK S.R.L., Valsamoggia (IT)

(72) Inventors: Alberto Bonazza, Ferrara (IT); Daniele Mezzaro, Ferrara (IT); David Rosignoli, Pontegradella (IT)

(73) Assignee: CT PACK S.R.L., Valsamoggia (IT)

(*) Notice: Subject to any disclaimer, the term of this patent is extended or adjusted under 35 U.S.C. 154(b) by 362 days.

(21) Appl. No.: 16/859,419

(22) Filed: Apr. 27, 2020

(65) Prior Publication Data

US 2020/0348643 A1    Nov. 5, 2020

(30) Foreign Application Priority Data

May 2, 2019    (IT) ........................ 102019000006492

(51) Int. Cl.
| | |
|---|---|
| *G06F 7/00* | (2006.01) |
| *G05B 19/402* | (2006.01) |
| *B65B 5/06* | (2006.01) |
| *B65B 25/00* | (2006.01) |
| *B65B 43/52* | (2006.01) |

(Continued)

(52) U.S. Cl.
CPC .............. *G05B 19/402* (2013.01); *B65B 5/06* (2013.01); *B65B 25/007* (2013.01); *B65B 43/52* (2013.01); *B65G 47/905* (2013.01); *G06Q 10/087* (2013.01); *B65G 2201/0202* (2013.01);

(Continued)

(58) Field of Classification Search
CPC ........ G05B 19/402; G05B 2219/39148; B65B 5/06; B65B 25/007; B65B 43/52; B65B 35/44; B65B 57/10; B65B 35/36; B65B 35/30; B65B 5/08; B65B 57/00;

(Continued)

(56) References Cited

U.S. PATENT DOCUMENTS

| | | |
|---|---|---|
| 2010/0310348 A1 | 12/2010 | Zecchini et al. |
| 2017/0203865 A1 | 7/2017 | Kalany et al. |
| 2020/0317445 A1* | 10/2020 | Schultz ................ G05B 19/042 |

FOREIGN PATENT DOCUMENTS

| | | |
|---|---|---|
| CN | 103253397 A | 8/2013 |
| CN | 104512567 A | 4/2015 |

(Continued)

OTHER PUBLICATIONS

Italian Search Report dated Dec. 5, 2019 for counterpart Italian Application No. 102019000006492.

(Continued)

*Primary Examiner* — Yolanda R Cumbess
(74) *Attorney, Agent, or Firm* — Shuttleworth & Ingersoll, PLC; Timothy J. Klima

(57) ABSTRACT

A method for automatically boxing ice cream type products allows, via an apparatus with simple mechanical configuration, a sequence of boxing steps to be performed, keeping constant the number of products boxed from one boxing sequence to another, in consideration of possible variations, from one boxing sequence to another, in the spatial distribution of absences of product on the transport system, operating between the apparatus for production of the products and the boxing unit, with the boxing unit being configured, for each boxing sequence, for picking up the products and transferring them into at least one box. The apparatus is configured to automatically perform the method.

12 Claims, 8 Drawing Sheets

(51) Int. Cl.
  *B65G 47/90* (2006.01)
  *G06Q 10/08* (2012.01)
(52) U.S. Cl.
  CPC ............... *B65G 2203/0233* (2013.01); *G05B 2219/39148* (2013.01); *G06Q 10/0832* (2013.01)
(58) Field of Classification Search
  CPC .......... B65G 47/905; B65G 2201/0202; B65G 2203/0233; G06Q 10/087; G06Q 10/0832
  USPC ........................... 53/443; 700/213, 228, 230
  See application file for complete search history.

(56) References Cited

FOREIGN PATENT DOCUMENTS

| | | |
|---|---|---|
| CN | 206665011 U | 11/2017 |
| CN | 107646015 A | 1/2018 |
| CN | 207223965 U | 4/2018 |
| CN | 111874295 A | 11/2020 |
| DE | 102017203600 A1 | 9/2018 |
| EP | 3450332 A1 | 3/2019 |
| WO | 2006015657 A1 | 2/2006 |

OTHER PUBLICATIONS

Chinese Office Action dated May 10, 2021 from counterpart Chinese Patent Application No. 202110712382.0.

* cited by examiner

METHOD AND APPARATUS FOR BOXING ICE CREAM TYPE PRODUCTS

This application claims priority to Italian Patent Application 102019000006492 filed May 2, 2019, the entirety of which is incorporated by reference herein.

BACKGROUND OF THE INVENTION

This invention relates to a method for automatically boxing ice cream type products. The method allows, via an apparatus with simple mechanical configuration, a sequence of boxing steps to be performed, keeping constant the number of products boxed from one boxing sequence to another. This includes consideration of possible variations, from one boxing sequence to another, in the spatial distribution of the absences of product on the transport system, operating between the apparatus for production of the products and the boxing unit. The boxing unit is configured, for each boxing sequence, for picking up the products and transferring them in at least one box. The invention also relates to an apparatus configured to automatically perform the method.

Currently, the methods for making and boxing ice cream type products comprise the use of an apparatus for producing the products, a unit for wrapping the products, which operates on the products at the outfeed from the production apparatus, and a unit for boxing the products, which operates on the wrapped products. The wrapping unit operates on the products whilst they are situated on a transport system operatively situated between the production apparatus and the boxing unit.

The configuration of the transport system must be designed to allow the wrapping unit to wrap the products leaving the production apparatus. In particular, the transport system comprises a conveyor belt suitably configured for stably retaining the products wrapped and to be boxed on the conveyor.

This configuration of the transport system, which, as mentioned, depends on the need to wrap the products, in turn requires a robotized boxing unit with a rather complicated mechanical configuration.

The boxing unit is configured to repeat sequentially an operational boxing sequence. Each repetition of the boxing operating sequence comprises the picking up of wrapped products situated on the transport system, and the transfer of the products picked up into at least one box. The boxing unit, in order to keep constant the number of products packed from one repetition to another, must be able to automatically detect, for each repetition, the actual respective positions of wrapped products on the transport system, in order to be able to pick up, for each sequence, always the desired number of wrapped products.

For this reason, the need for the boxing unit to box the same desired number of products from one sequence to another and the need to wrap the products, make the mechanical and the control of the boxing apparatus complex, which can be considered as comprising at least the wrapping unit and the boxing unit.

SUMMARY OF THE INVENTION

A method according to the invention and/or according to any one of the appended claims of the method allows products of the ice cream type to be automatically boxed by successive repetitions of an operational boxing sequence, keeping constant the number of products boxed from one repetition to another, and it is easier to control than the methods currently known and designed for this purpose.

An apparatus according to this invention and/or according to any one of the accompanying apparatus claims is configured to perform a method according to this description and/or according to any one of the accompanying method claims.

An apparatus according to the invention and/or according to any one of the appended claims of the apparatus allows products of the ice cream type to be automatically boxed (placed in boxes) by successive repetitions of an operational boxing sequence, keeping constant the number of products packed from one repetition to another, with a mechanical configuration simpler than the apparatuses currently known and designed for this purpose.

A method according to the invention and/or according to any one of the accompanying method claims is designed to be performed specifically by means of an apparatus according to this description and/or according to any one of the accompanying apparatus claims.

BRIEF DESCRIPTION OF THE DRAWINGS

The features of a method and an apparatus according to the invention will become clearer from the detailed description below, relating to respective possible example embodiments of a method and an apparatus according to the description.

The following detailed description refers to the accompanying drawings, in which.

DESCRIPTION OF THE PREFERRED EMBODIMENTS

FIGS. 1 to 5 refer to a possible example embodiment of a method according to the invention.

Unless otherwise specified, the term "method" is used to mean the possible embodiment of the method.

FIGS. 1 to 5 refer to a possible example embodiment of an apparatus according to the invention.

Hereinafter, unless specified otherwise, the term apparatus means the possible embodiment of the apparatus.

The apparatus is denoted by the numeral 1.

The apparatus 1 is configured to automatically perform the method. The method is designed in such a way that it can be performed using the apparatus.

The apparatus 1 is configured to automatically carry out the boxing of products. The apparatus 1 is configured in particular to automatically box products of the ice cream type. For this reason, each of these products could be an ice cream type product. The ice cream type product could be, for example, an ice cream on a stick.

The apparatus comprises a storage system or unit 2. The storage unit 2 is configured for automatically storing a predetermined number of products in a storage zone Z2.

The method comprises at least one operational boxing sequence.

The apparatus 1 is configured to perform the operating sequence.

The method could comprise performing the operating sequence repeatedly and sequentially. This means that the method could automatically perform a plurality of successive repetitions of the operating sequence.

The apparatus 1 is configured to perform the operating sequence repeatedly and sequentially. This means that the apparatus is configured to automatically perform a plurality of successive repetitions of the operating sequence.

FIGS. 1 to 5 can be considered as referring to a generic repetition of the operating sequence.

For each repetition of the operating sequence, a predetermined number of products and a predetermined number of boxes can be considered. This means that, for each repetition of the operating sequence, boxing the predetermined number of products in that predetermined number of boxes.

In FIGS. 1 to 5, each black circle identifies and/or schematically represents a product.

FIGS. 1 to 5 refer to the case in which the predetermined number of products to be packed is equal to four. The predetermined number could, however, be any number. In FIGS. 2 to 5 the products which are packed by means of the operating sequence are a first product p1, a second product p2, a third product p3 and a fourth product p4.

Figure 3:
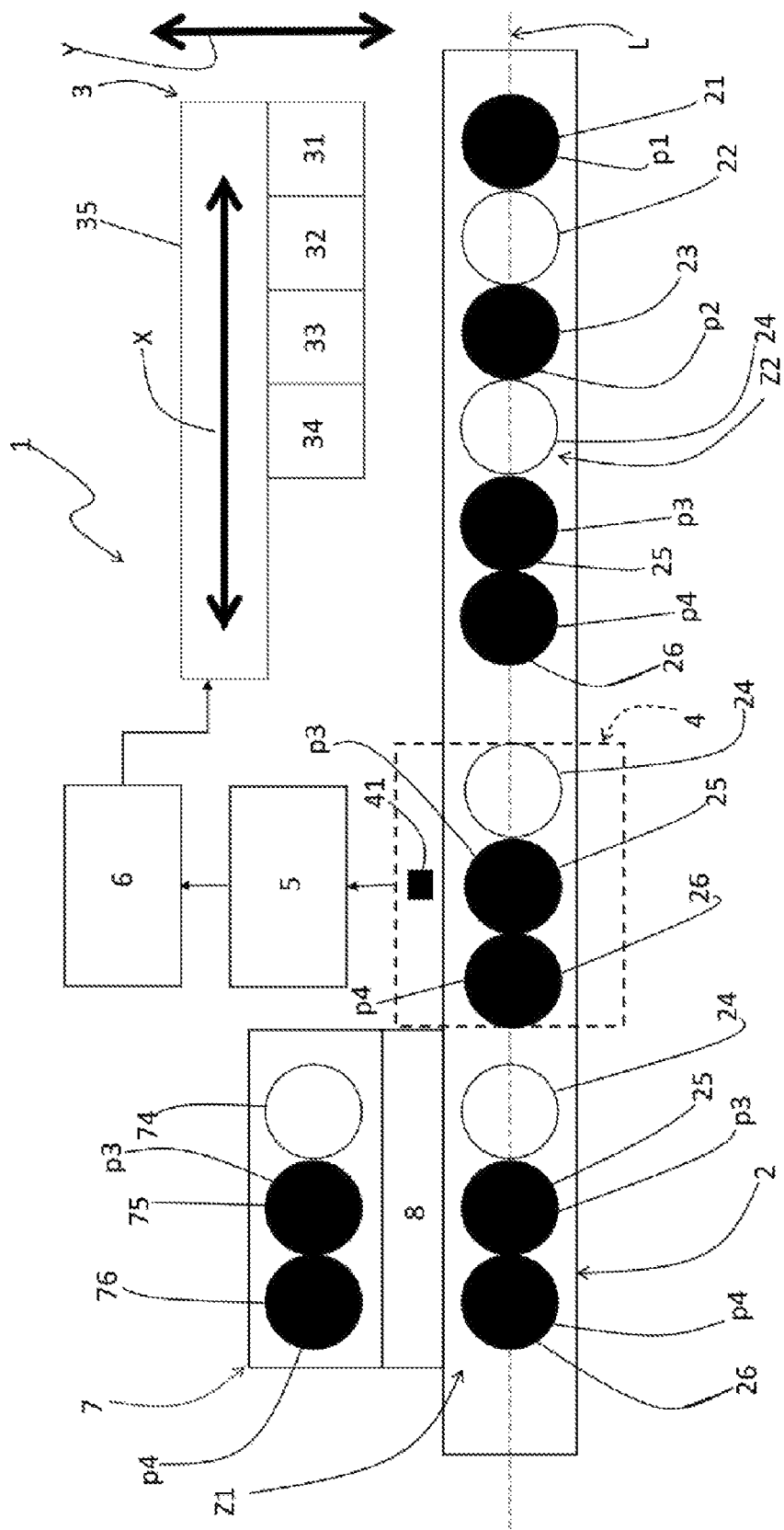
FIG. 3 is a schematic diagram of a second part of the operating sequence to which FIG. 2 refers, the second part being performed by the apparatus of FIG. 1.
Figure 4:
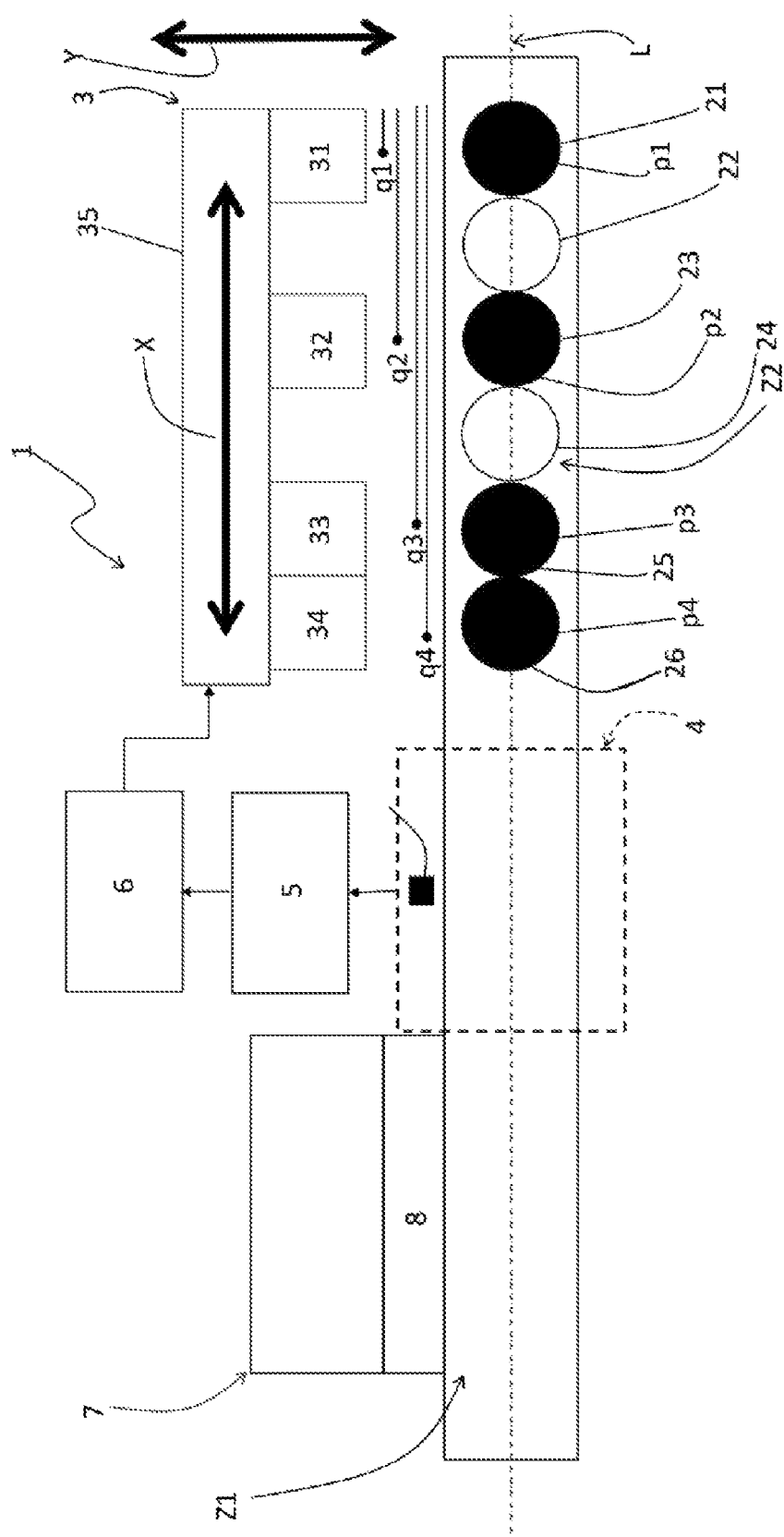
FIG. 4 is a schematic diagram of a third part of the operating sequence to which FIG. 2 refers, the third part being performed by the apparatus of FIG. 1.
Figure 5:
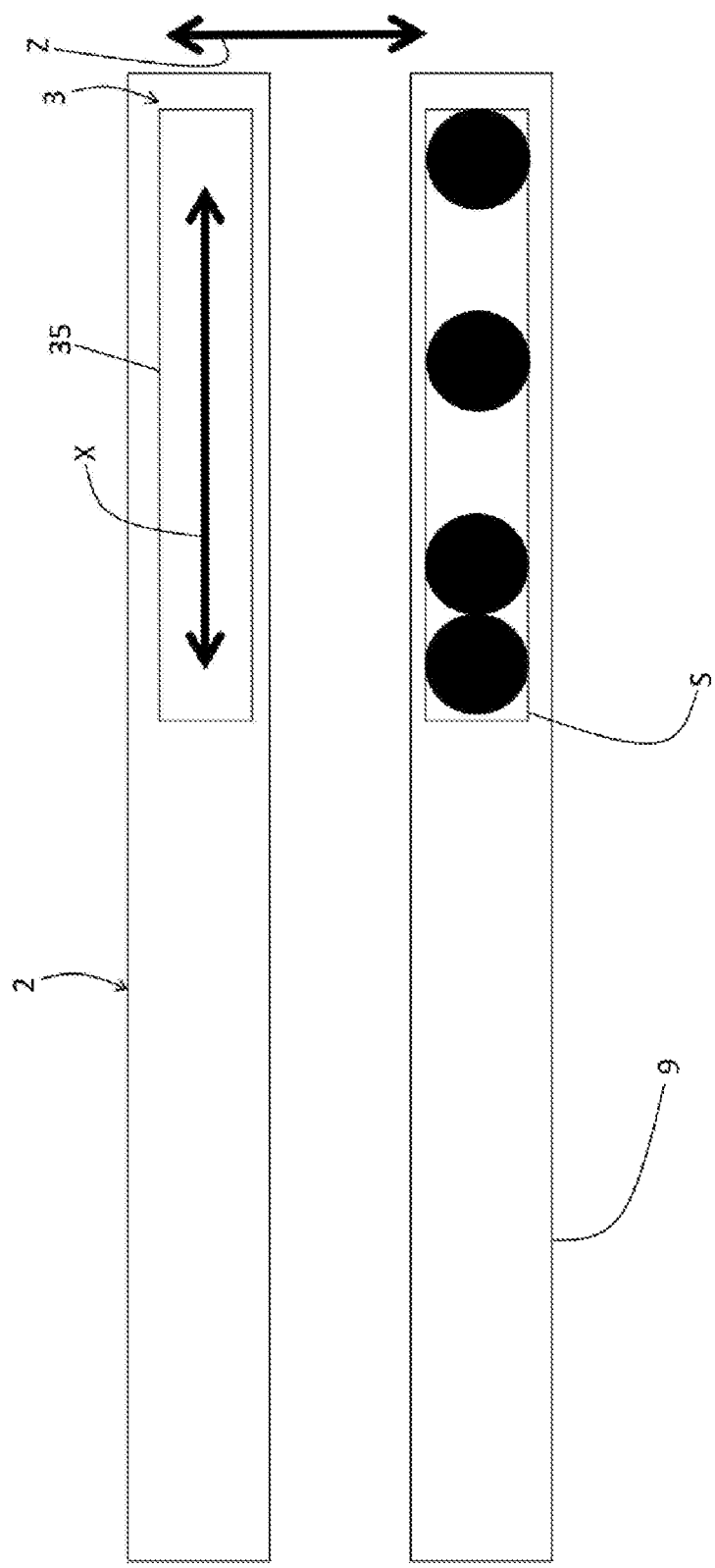
FIG. 5 is a schematic diagram of a fourth part of the operating sequence to which FIG. 2 refers, the fourth part being performed by the apparatus of FIG. 1.

FIGS. 1 to 5 refer to an example case such that the predetermined number of boxes is equal to one. The predetermined number of boxes could, however, be any number. FIG. 5 shows the box S in which the products p1, p2, p3 and p4 are packed.

The operating sequence comprises a storage step. During the storage step, the predetermined number of products to be packed is stored in the storage zone Z2.

The storage unit 2 is configured to perform the storage step.

Figure 2:
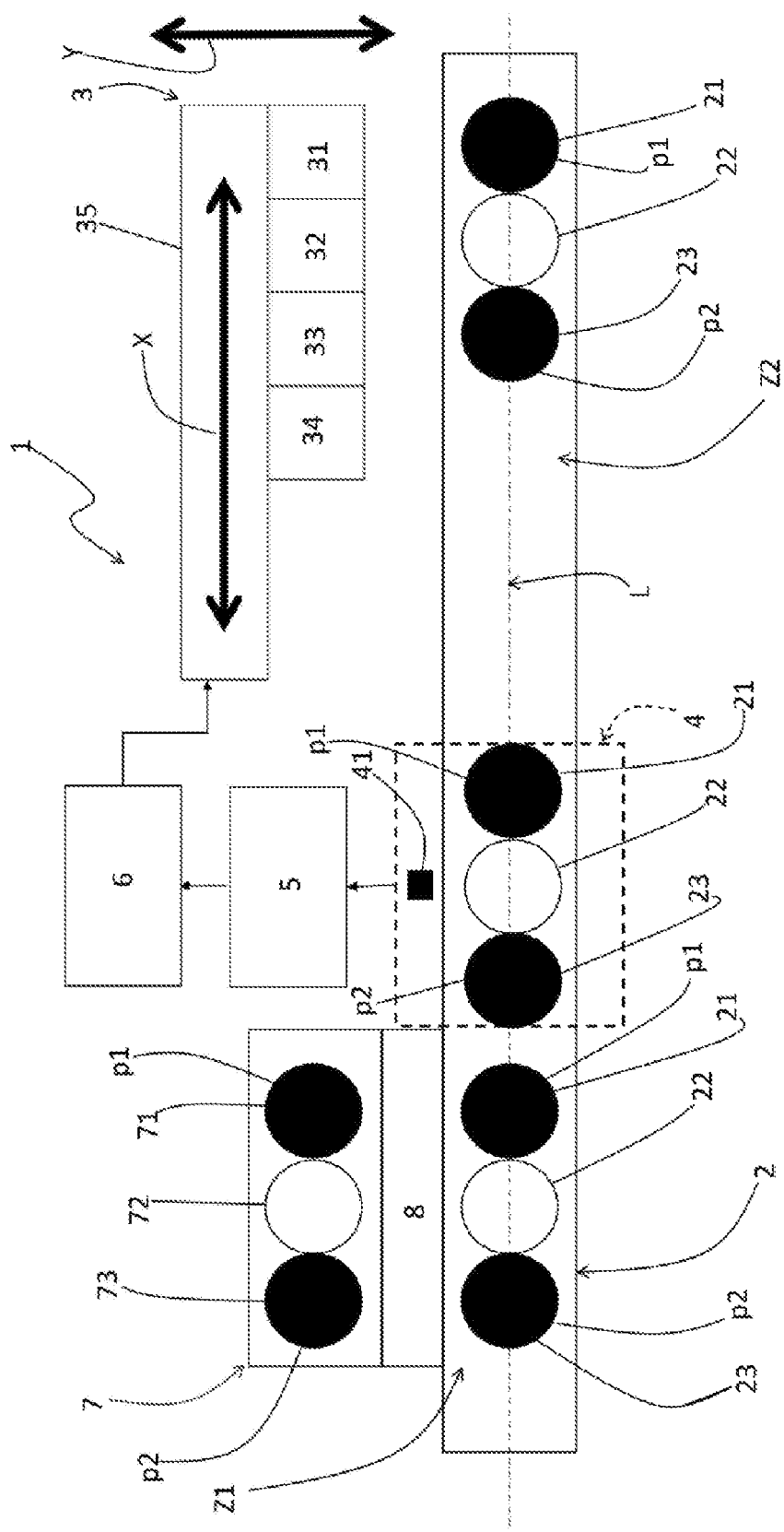
FIG. 2 is a schematic diagram of a first part of an operational boxing sequence in an example embodiment of a method according to the invention, the first part being performed by the apparatus of FIG. 1.

FIG. 2 illustrates a first part of the storage step. FIG. 3 illustrates a second part of the storage step.

In the first part of the storage step, shown in FIG. 2, a first product p1 and a second product p2 are stored in the storage zone Z2. In the second part of the storage step, shown in FIG. 3, a third product p3 and a fourth product p4 are stored.

The apparatus comprises a boxing system or unit 3. The boxing unit 3 comprises a plurality of boxing elements 31, 32, 33, and 34. The number of boxing elements could be equal to the predetermined number of products or different from the predetermined number of products.

FIGS. 1 to 5 refer to an example case such that the number of boxing elements is equal to four, and therefore equal to the predetermined number of products to be boxed. In FIGS. 1 to 5, the boxing elements are labelled 31, 32, 33 and 34.

The boxing unit 3 is configured for picking up the stored products p1, p2, p3, and p4. The boxing unit 3 is configured so that each boxing element 31 or 32 or 33 or 34, starting from a respective starting position relative to the storage zone Z2, picks up and boxes a respective product to be boxed p1 or p2 or p3 or p4. Each boxing element can therefore also be considered to be a pick-up element and/or a transfer element.

The operating sequence comprises, after said storage step, a step for picking up the stored products p1, p2, p3 and p4. During the picking up step, each boxing element 31 or 32 or 33 or 34, starting from the respective starting position relative to said storage zone Z2, picks up a respective product to be boxed p1 or p2 or p3 or p4.

FIG. 4 relates to an initial instant of the picking up step, in which each boxing element 31 or 32 or 33 or 34 is positioned in the respective starting position.

The operating sequence comprises, after said picking up step, a step of boxing the products picked up p1, p2, p3 and p4. During the boxing step, each boxing element 31 or 32 or 33 or 34 places the respective product picked up p1-p4 into a box.

The boxing unit 3 is configured to perform the picking up step and the boxing step.

FIG. 5 relates to a final instant of the boxing step, in which the products picked up p1, p2, p3 and p4 have been boxed in the predetermined number of boxes. FIG. 5 shows a box labelled S, since the predetermined number of boxes, in the example shown in FIGS. 1 to 5, is equal to one.

The apparatus comprises a conveyor 9 which conveys and/or transports the boxes in which the products are packed.

The storage unit 2 comprises a plurality of storage elements.

FIGS. 1 to 5 refer to an example case wherein the number of storage elements is equal to 6. The number of storage elements could, however, be any number.

FIG. 2 shows three storage elements, labelled 21, 22 and 23, respectively. In FIGS. 3 and 4 another three storage elements are labelled 24, 25 and 26, respectively.

The storage unit 2 is configured for moving the plurality of storage elements 21, 22, 23, 24, 25, and 26, in order to move said products p1, p2, p3, and p4, from a receiving zone Z1 to the storage zone Z2.

The storage unit 2 is configured so that the plurality of storage elements can receive the products in the receiving zone Z1 and from a transport system 7. The transport system 7 in turn receives the products feeding out of the production apparatus. The transport system is labelled 7 in FIGS. 1 to 4. The transport system 7 comprises transport elements each configured for transporting a product present in the transport element.

The apparatus 1 could comprise the transport system 7.

The apparatus 1 could also comprise a transfer system 8. The transfer system 8 is configured for transferring each of the products present in the transport system 7, from the respective transport element 7 to a respective storage element.

FIGS. 1 to 5 refer to an example case wherein the number of transport elements is equal to six. However, the number of transport elements could be any number.

FIG. 2 indicates three transport elements, labelled 71, 72 and 73, respectively. In FIG. 3 another three transport elements are labelled 74, 75 and 76, respectively.

In FIGS. 1 to 4, if a transport element is white inside, then there is no product in the transport element. In FIGS. 1 to 4, if a transport element is black inside, there is a product in the transport element.

Figure 1:
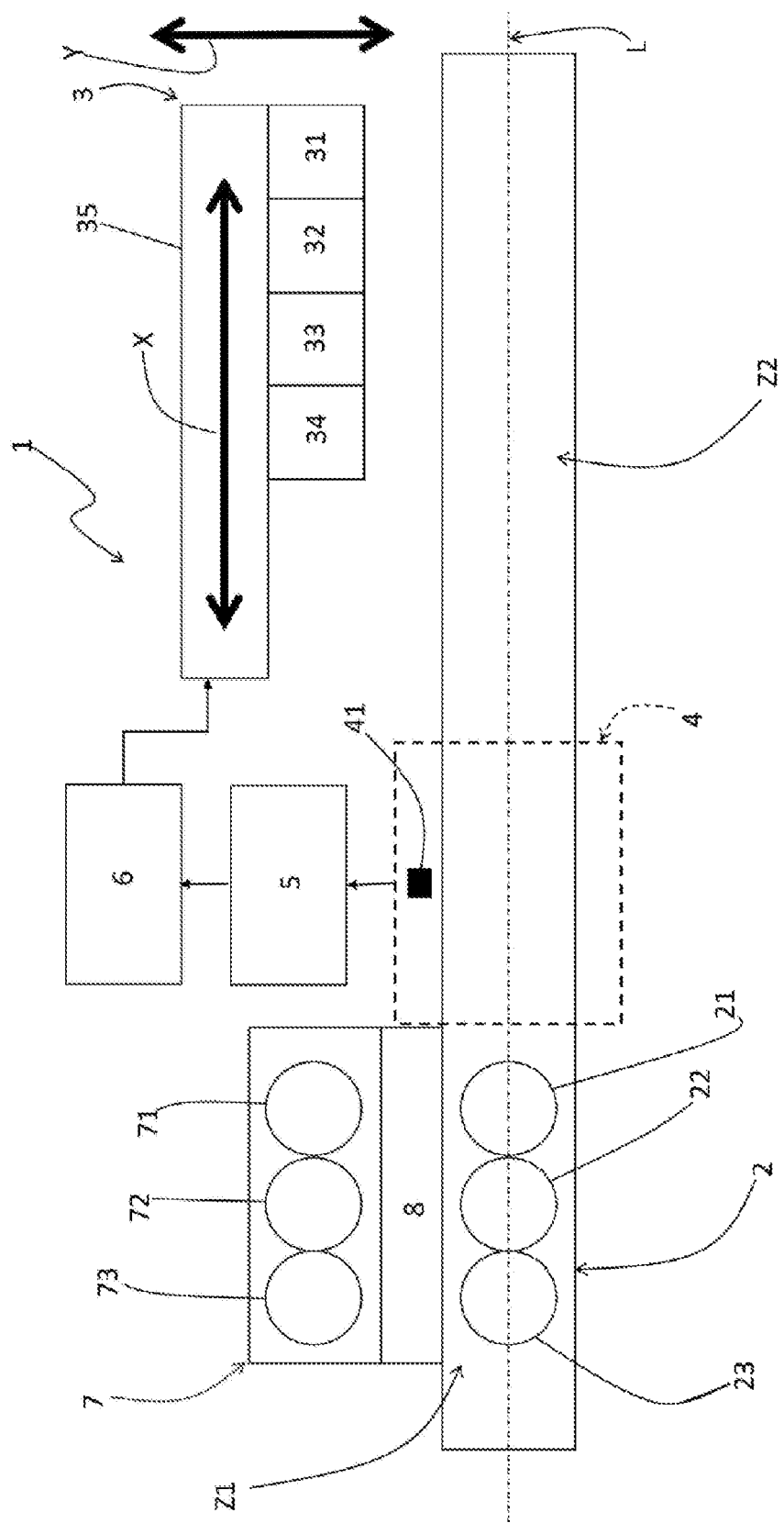
FIG. 1 is a schematic diagram of an example embodiment of an apparatus according to the invention.

It should be noted that FIG. 1 does not show products as FIG. 1 is aimed mainly at schematically illustrating the characteristics of the apparatus.

Each storage element 21, 22, 23, 24, 25 or 26 is configured to transport a respective product present in the respective storage element 21, 22, 23, 24, 25, or 26, during the movement from the receiving zone Z1 to the storage zone Z2.

In FIGS. 1 to 4, if a storage element is white inside, then no product is present in the storage element. In FIGS. 1 to 4, if a storage element is black inside, there is a product in the storage element.

The storage step comprises at least one step of moving the plurality of storage elements from the receiving zone Z1 to the storage zone Z2.

If the storage step comprises a plurality of movement steps, at least two of these movement steps could occur at least partly simultaneously.

FIGS. 1 to 5 refer to an example case such that the storage step comprises a first movement step and a second movement step. The number of movement steps could be any number.

FIG. 2 may be considered as an example of the first movement step, during which the first three storage elements 21, 22 and 23 are moved from the receiving zone Z1 to the storage zone Z2. In FIG. 2, the first three storage elements 21, 22 and 23 with the products p1 and p2 are therefore shown both in the receiving zone Z1 and in the storage zone Z2.

FIG. 3 may be considered as an example of the second movement step, during which the second three storage elements 24, 25 and 26 are moved from the receiving zone Z1 to the storage zone Z2. In FIG. 3, the second three storage elements 24, 25 and 26 with the products p3 and p4 are therefore shown both in the receiving zone Z1 and in the storage zone Z2.

Each storage element 21, 22, 23, 24, 25 or 26 is configured to transport, during the movement step, a respective product present in the respective storage element 21, 22, 23, 24, 25 or 26.

FIG. 2 relates to an example embodiment such that, during the first movement step, a first storage element 21 transports from the receiving zone Z1 to the storage zone Z2 a first product p1, and a third storage element 23 transports from the receiving zone Z1 to the storage zone Z2 a second product p2.

FIG. 2 relates to an example embodiment such that, during the first movement step, no product is present in the second storage element 22. This may be due to an error in the steps of production of the products and/or in the step of transporting the products towards the storage unit 2 using the transport system 7. The absence of a product in the second storage element 22 derives, in the example illustrated in the accompanying drawings, from the absence of a product in the second transport element 72.

In FIG. 3 a fifth storage element 25 transports from the receiving zone Z1 to the storage zone Z2 a third product p3, and a sixth storage element 26 transports a fourth product p4 from the receiving zone Z1 to the storage zone Z2.

FIG. 3 relates to an example embodiment such that, during the second movement step, no product is present in the fourth storage element 24.

The apparatus 1 comprises a monitoring unit 4. The apparatus 1 is configured so that the monitoring unit 4 automatically monitors, for each storage element 21, 22, 23, 24, 25 or 26, the presence or absence of a respective product in the respective storage element 21, 22, 23, 24, 25 or 26, whilst the respective storage element 21, 22, 23, 24, 25 or 26 is moved from the receiving zone Z1 to the storage zone Z2.

The operating sequence comprises, for each movement step, a monitoring step. During the monitoring step, for each storage element 21, 22, 23, 24, 25 or 26, the presence or absence of a respective product in the respective storage element 21 or 22 or 23 or 24 or 25 or 26 is monitored, whilst the respective storage element 21, 22, 23, 24, 25 or 26 is moved from the receiving zone Z1 to the storage zone Z2.

The monitoring unit 4 is configured to perform the monitoring step. In order to perform the monitoring step, the monitoring unit 4 could comprise an operating sensor 41 between the receiving zone Z1 and the storage zone Z2.

The monitoring unit 4, to perform the monitoring step, could comprise an electronic processing unit. The electronic processing unit of the monitoring unit 4 could comprise a hardware and a software loaded on the hardware of the monitoring unit 4, to perform at least a part of the monitoring step.

FIGS. 1 to 5 refer to an example case such that the operating sequence comprises a first monitoring step for the first movement step, and a second monitoring step for the second movement step.

FIG. 2 may also be considered as an illustration of the first monitoring step, since the first three storage elements 21, 22 and 23 are also shown visually in the monitoring unit 4.

FIG. 3 may also be considered as an illustration of the second monitoring step, since the second three storage elements 24, 25 and 26 are also shown visually in the monitoring unit 4.

The apparatus 1 comprises a determining module 5. The apparatus 1 is configured so that the determining module 5 automatically determines, for each product to be boxed p1 or p2 or p3 or p4 and depending on the presence or absence of respective products in the respective storage elements 21, 22, 23, 24, 25, 26, a respective storage position of the respective product to be boxed p1 or p2 or p3 or p4 in the storage zone Z2. This position determined is to be considered a position in and relative to the storage zone Z2.

The operating sequence comprises a determining step. During this step, a respective storage position of the product to be boxed p1 or p2 or p3 or p4 in the storage zone Z2 is determined automatically for each product p1-p4 to be boxed depending on the presence or absence of respective products in the respective storage elements 21, 22, 23, 24, 25, 26. This position is to be considered a position in and relative to the storage zone Z2.

The determining module 5 is configured to perform the determining step. The determining module 5, to perform the determining step 5, could comprise an electronic processing unit. The electronic processing unit of the determining module 5 could comprise a hardware and a software loaded on the hardware of the determining module 5, to perform at least a part of the determining step 5.

The determining step is performed automatically as a function of the results of the monitoring step.

The monitoring unit 4 and the determining module 5 are in communication to exchange signals and/or data.

To perform the determining step, the determining module 5 knows at least the kinematic configuration of the at least one movement step by which the storage step is performed, and the geometrical configuration of the storage unit 2.

The apparatus 1 comprises a setting up unit 6. The apparatus 1 is configured so that the setting up unit 6 sets up automatically, for each boxing element 31 or 32 or 33 or 34, and as a function of the storage position determined of the respective product p1-p4 to be boxed, the starting position of the respective boxing element 31 or 32 or 33 or 34. For this reason, the setting up unit 6 automatically sets up the starting position of each boxing element as a function of the storage position determined, during the determining step, for the respective product which the respective boxing element must pick up or will have to pick up.

The operating sequence comprises an automatic setting up step. During the setting up step the starting position of the respective boxing element 31 or 32 or 33 or 34 is set up automatically for each boxing element 31 or 32 or 33 or 34, and as a function of the storage position determined of the respective product to be boxed p1 or p2 or p3 or p4.

The starting position of each boxing element 31 or 32 or 33 or 34 is automatically set up in such a way as to minimize, as much as mechanically possible, the distance between each boxing element 31 or 32 or 33 or 34 and the respective product to be boxed p1 or p2 or p3 or p4, in the respective starting position of each boxing element 31, or 32 or 33 or 34. For this reason, for each boxing element, the respective starting position is set up in such a way as to minimize the distance between the respective boxing element and the product which the respective boxing element must pick up or will have to pick up.

The setting up step is performed automatically as a function of the results of the obtaining step. The setting up unit 6 is configured to perform the setting up step.

The setting up unit 6, to perform the setting up step, could comprise an electronic processing unit. The electronic processing unit of the setting up unit 6 could comprise a hardware and a software loaded on the hardware of the setting up unit 6, to perform at least a part of the setting up step 6.

The obtaining module 5 and the setting up unit 6 are in communication to exchange signals and/or data.

The setting up unit 6, to perform the setting up step, could comprise a movement system. The movement system is configured for adjusting the starting position of each boxing element 31, 31, 33 or 34 mechanically independently of that of the others. The setting up unit 6 in this case is configured so that the movement system can be controlled automatically by the processing unit of the setting up unit 6, in such a way as to automatically perform the setting up step.

During the setting up step, one or more of the boxing elements could be moved relative to the storage zone Z2 mechanically independently from the others.

The monitoring steps, the obtaining step and the setting up step are performed in such a way that the starting position of each boxing element 31 or 32 or 33 or 34 is optimized to make possible and/or speed up and/or facilitate the picking up step which will be performed by the boxing unit 3, automatically taking into account the actual distribution of the possible absences of product in one or more of the storage elements 21-26. In this way it is possible to keep constant, from one repetition to another of the operating sequence, the number of products actually boxed, even using a boxing unit which has a simpler mechanical configuration.

In particular, according to the method, the products are boxed preferably without being wrapped. Since the products must not be wrapped, the storage unit need not have a configuration dependent on the need to perform the wrapping step, and in this way it is possible to also use a boxing unit with the mechanical and/or electronic configuration which is simpler, for example with serial kinematics.

The monitoring steps, the obtaining step and the setting up step allow a less complex boxing unit to be, in any case, able to automatically adapt to the variation in the distribution of lack of product in the storage unit.

It should be noted that the boxing method could comprise repeating sequentially the above-mentioned operating sequence.

From one repetition to the other, the distribution and/or positioning of the lack of product in the storage unit 2 could vary.

For each repetition of the operating sequence, the automatic setting up step is performed in such a way as to keep constant the number of products picked up p1 or p2 or p3 or p4 from one repetition to another, with variations in the presence or absence of respective products in the storage elements.

The storage elements 21, 22, 23, 24, 25, 26 define a row of storage elements.

The storage unit 2 is configured for moving the storage elements 21, 22, 23, 24, 25, 26, from said receiving zone Z1 to said storage zone Z2, by translation along the direction of extension L of the row.

Each movement step therefore occurs by translating along the direction of extension L of the row.

Each boxing element 31 or 32 or 33 or 34 is movable relative to said storage zone Z2 mechanically independently from the others, in such a way that the setting up step is performed by automatically controlling the starting position of each boxing element 31 or 32 or 33 or 34 at least partly independently from that of the others.

The apparatus 1 is configured so that the setting up unit 6 can move each boxing element 31 or 32 or 33 or 34 relative to said storage zone Z2, mechanically independently from the others, in such a way as to automatically control the starting position of each boxing element 31 or 32 or 33 or 34 at least partly independently from that of the others.

The setting up unit 6 is configured for moving each boxing element 31 or 32 or 33 or 34 relative to said storage zone Z2, mechanically independently from the others, via the above-mentioned movement system. The movement system could comprise a respective motor for each of the boxing elements 31 or 32 or 33 or 34. The motor could be a linear electric motor.

The boxing unit 3 comprises a shared support 35 which supports the boxing elements 31, 32, 33, and 34. The shared support 35 is oriented at least mainly along a longitudinal direction X parallel to said direction of extension L.

The setting up step is performed, for each boxing element 31 or 32 or 33 or 34, by automatic selection of the respective position q1 or q2 q3 or q4 of the respective boxing element 31 or 32 or 33 or 34 along the longitudinal direction X oriented at least mainly along said direction of extension L. The respective selected position of each boxing element 31 or 32 or 33 or 34 corresponds to the respective position along the direction of extension L of the position obtained of the respective element to be boxed p1 or p2 or p3 or p4. For this reason, each boxing element is positioned by the setting up unit 6 at the same position, along the longitudinal direction X, of the respective product which the respective boxing element must pick up or will have to pick up.

For each boxing element 31 or 32 or 33 or 34, the respective position along the longitudinal direction X is a position along the support 35.

In FIG. 4 the label q1 denotes the set position of the first boxing element 31, q2 denotes the set position of the second boxing element 32, q3 denotes the set position of the third boxing element 33, and q4 denotes the set position of the fourth boxing element 34.

The setting up unit 6 is configured for automatically setting up the respective starting position of each boxing element 31 or 32 or 33 or 34) moving each boxing element 31 or 32 or 33 or 34 along said support 35 and mechanically independently from the other boxing elements.

The support 35 is a track which allows the movement of each boxing element to be guided in order to adjust the respective starting position.

The picking up step is performed by at least a first movement of said support 35. The first movement of the support 35 comprises at least one component along a second direction Y transversal to said longitudinal direction X. The boxing elements 31, 32, 33, and 34 are integral with the first movement.

The boxing step is performed by at least a second movement of said support 35. The second movement comprising at least one component along a third direction Z which is transversal to said first direction X and second direction Y. The boxing elements 31, 32, 33, and 34 are integral with said second movement.

In FIG. 5 the support 35 is shown before the second movement, but the products p1, p2, p3 and p4 are shown in boxes as if the second movement had already been performed.

Each boxing element 31, 32, 33 or 34 is configured for gripping the respective product to be boxed, during the picking up step, for moving it towards the box S, and for releasing. placing or depositing it in the box S during the boxing step.

The reciprocal orientation between the first direction X, second direction Y, and third direction Z, can be derived by comparing FIGS. 1 to 4, which show the apparatus laterally, with FIG. 5, which shows the apparatus from above.

The boxing unit 3 is configured to cause the first movement of the support 35 and so that the boxing elements 31, 32, 33 and 34 are integral with said first movement. In this way, the boxing elements 31, 32, 33, and 34 pick up the respective products p1, p2, p3, and p4 to be boxed, by at least said first movement.

The setting up unit 6 is configured to maintain the set up position of each boxing element during the first movement, in such a way that the setting up of the starting position of each boxing element 31, 32, 33 or 34 is maintained during the picking up step.

The boxing unit 3 is configured to cause the second movement of the support 35 and so that the boxing elements 31, 32, 33 and 34 are integral with said second movement. In this way, the boxing elements 31, 32, 33, and 34 box the respective products picked up p1, p2, p3, p4 by at least said second movement.

The boxing unit 3 has in this way serial kinematics and is therefore mechanically simpler to control than the boxing units currently used in the prior art of the methods for boxing products of the ice cream type.

The apparatus in any case allows the number of products boxed to be kept constant for each repetition of the operating sequence, by detecting the absence of product in the storage unit 2.

The method makes it possible to keep constant the number of products boxed even if the number of storage elements used during the storage step is different from the predetermined number of products to be boxed. In FIGS. 1 to 4, the number of storage elements used to perform the storage step is equal to six, whilst the predetermined number of products to be boxed is four.

This makes it possible to achieve a greater flexibility of the boxing apparatus with respect to possible variations in the transport system 7.

Figure 6:
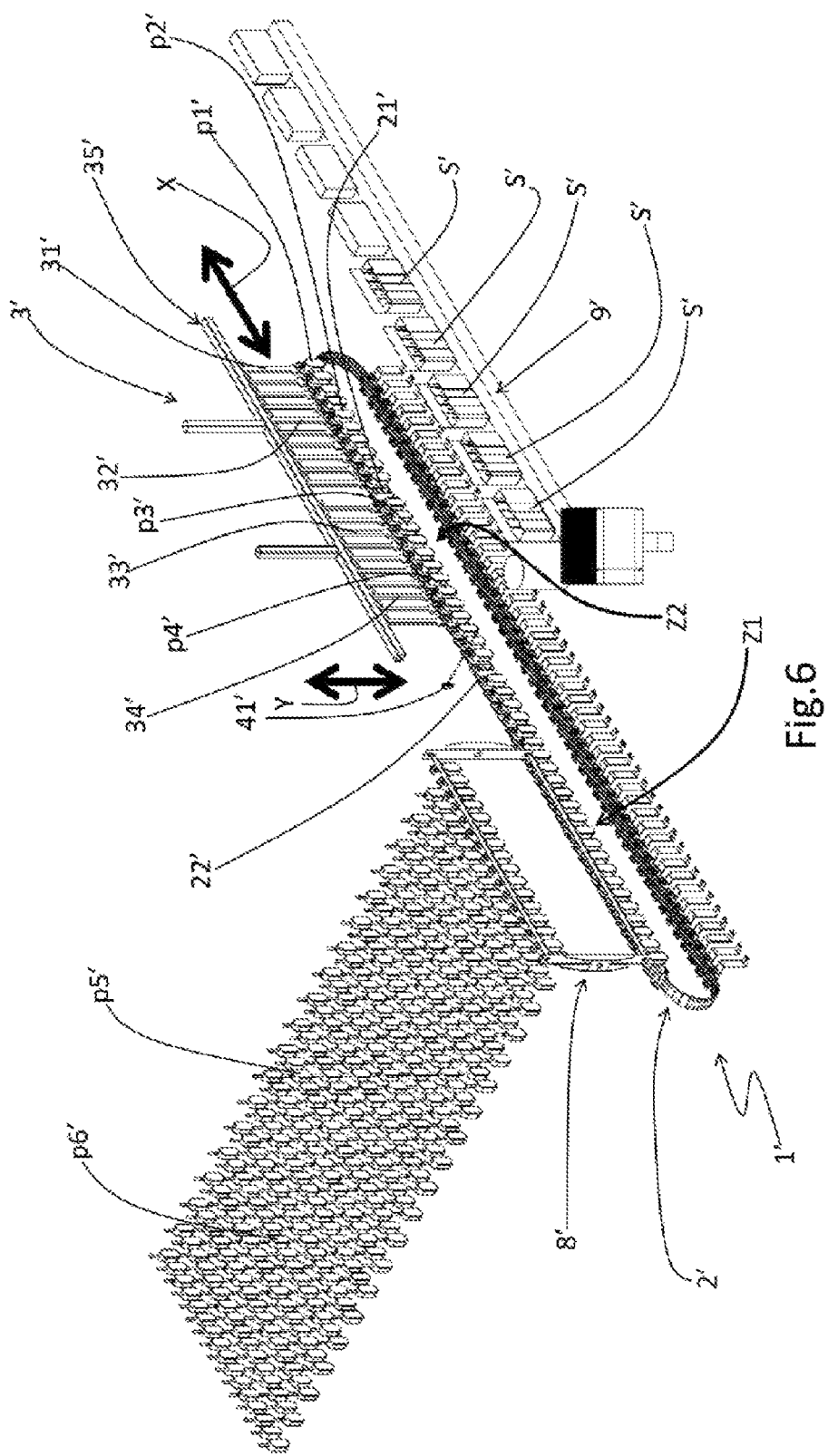
FIG. 6 is a perspective view of a possible preferred embodiment of an apparatus according to the invention, during a possible preferred embodiment of a method according to the invention.
Figure 7:
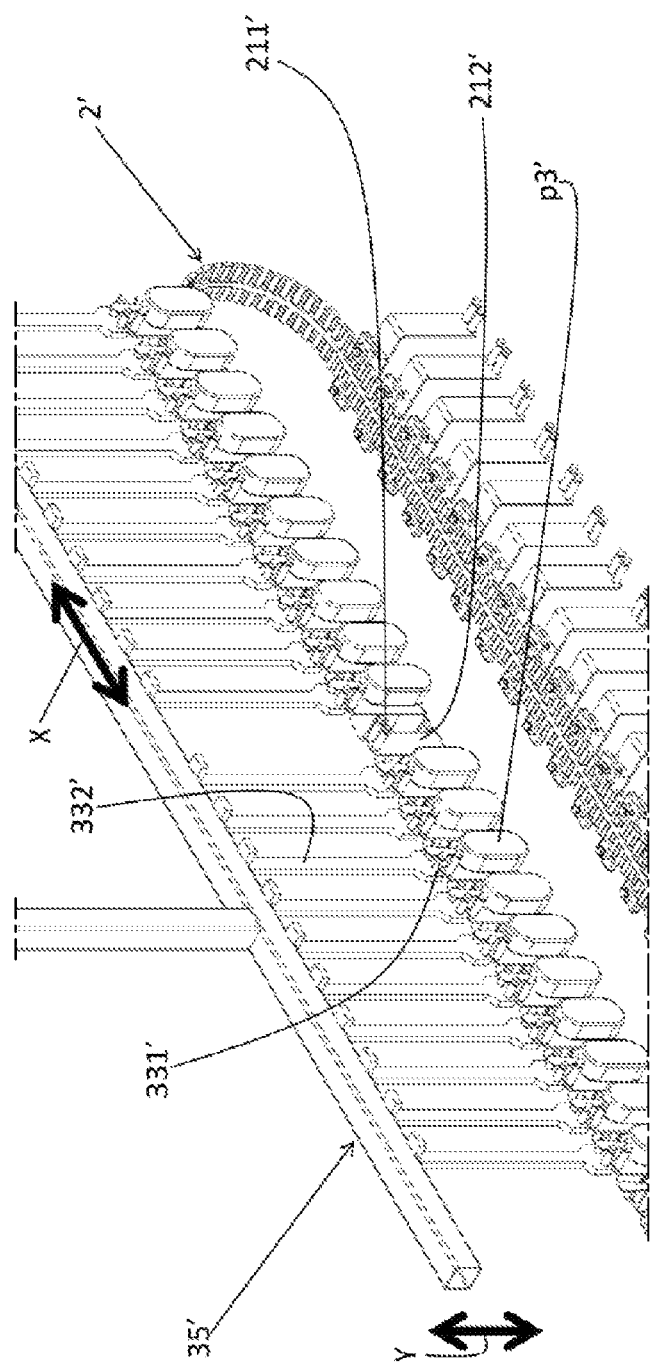
FIG. 7 is a detailed view of the preferred embodiment of FIG. 6.
Figure 8:
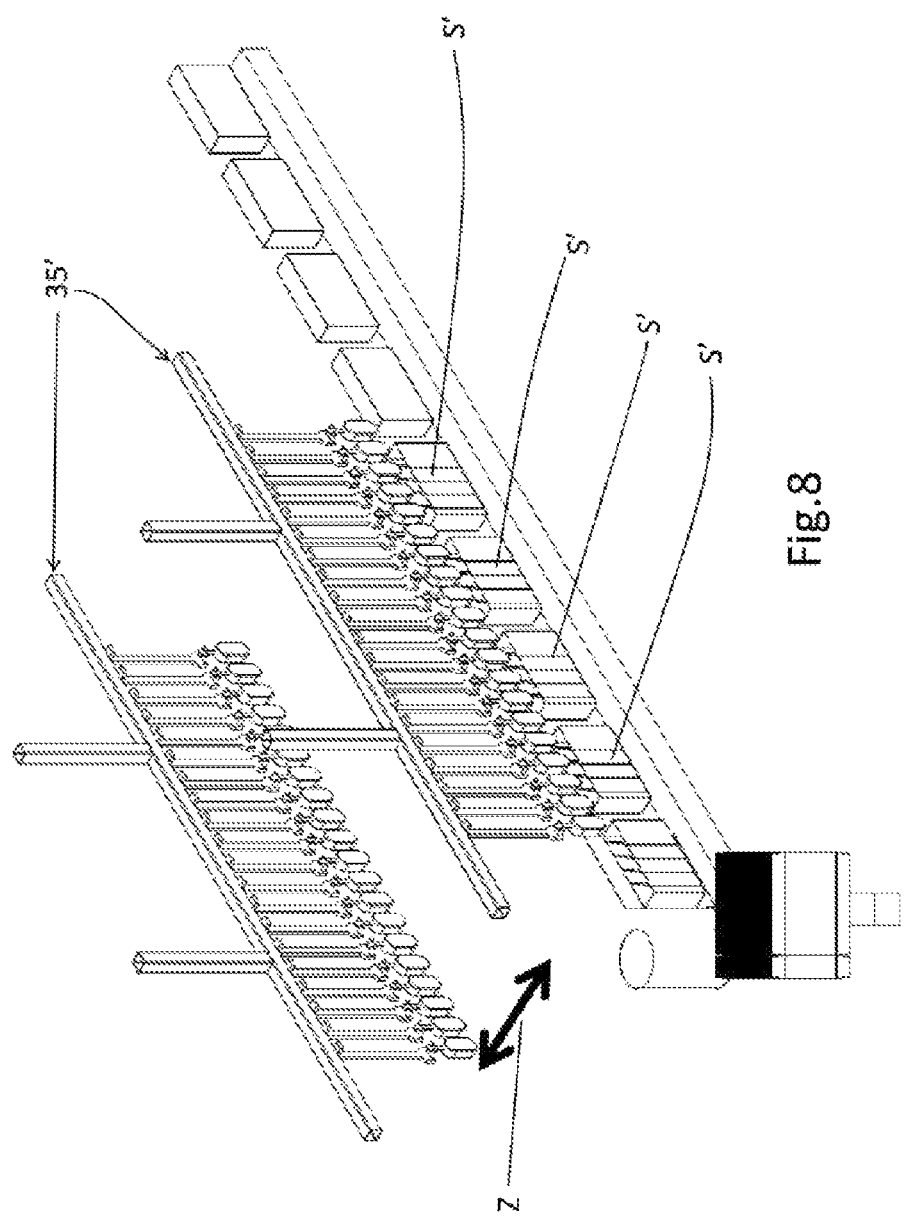
FIG. 8 is a perspective view of a movement step of a component of the preferred embodiment.

FIGS. 6 to 8 show a preferred embodiment of an apparatus according to the invention. The preferred embodiment is labelled 1'.

In FIGS. 6 to 8, p6' and p5' are any two products which have not yet been received by the storage unit 2'. The system for transferring the products from the transport system to the storage unit 2' is labelled 8'. The transfer system 8' shown in the drawing is a rotary or translating gripper.

The numerals 31', 32', 33', and 34' denotes a plurality of boxing elements which are part of the boxing unit 3' and which are supported by the shared support 35'. The numerals p1', p2', p3', and p4' denote the products stored and which will be boxed in the boxes S' by the boxing elements 31', 32', 33' and 34', respectively.

In the case of FIGS. 6 to 8, the predetermined number of products, which is equal to the number of boxing elements, is equal to twenty. In the case of FIGS. 6 to 8, the number of storage elements used for the storage step of each operating sequence is equal to sixteen. In the case of FIGS. 6 to 8, the predetermined number of boxes is greater than one.

FIG. 6 shows a first storage element 21', in which there is no product and which is situated in the storage zone, and a second storage element 22', in which there is no product and which is situated between the receiving zone Z1 and the storage zone Z2.

FIGS. 6 and 7 do not indicate the storage elements in which the products are present.

The numeral 41' in FIG. 6 denotes the sensor of the detection unit which detects the presence or absence of product for each storage element.

FIG. 7 shows more closely the storage element 21' and the boxing element 33'.

Each storage element may have one or more of the features of the storage element 21' or all the features of the storage element 21'. Each boxing element may have one or more of the features of the boxing element 33' or all the features of the boxing element 33'.

Each storage element comprises a body 212' and a gripper 211' supported by the body 212' and configured for retaining the product. The gripper 211' of each storage element is configured to adopt a release condition, in which it receives the respective product from the transfer system 8 or releases the product so that it is gripped by a respective boxing element. The gripper 211' of each storage element is configured to adopt an operating condition, in which it retains the product to move it from the receiving zone Z1 to the storage zone Z2.

The gripper 211' of each storage element is configured for retaining the product, in the operating condition, gripping the stick of the product, if the product is of the ice cream type with a stick.

Each boxing element comprises a body 312' and a gripper 311' supported by the body 311' and configured for retaining the product. The gripper 311' of each boxing element is configured to adopt a release condition, in which it either receives the respective product from a respective storage element or releases the product for depositing it in the box S'. The gripper 311' of each boxing element is configured to adopt an operating condition, in which it retains the product during transfer into the box S' which occurs preferably by means of the above-mentioned second movement.

In FIG. 8 the shared support 35' which supports the boxing elements is visible both at the start and at the end of the above-mentioned second movement, which comprises at least one component along the third direction Z and which allows the boxing unit to box the products in the boxes S'.

A boxing method according to the invention allows the automatic boxing of products of the ice cream type, by means of successive operational boxing sequences, using a boxing unit which is simpler from a mechanical and/or electronic point of view, keeping constant the number of products boxed in each repetition of the operating sequence with respect to possible variations in the spatial distribution of gaps of product in the components upstream of the boxing apparatus.

In particular, the method lends itself to the boxing of products of the non-wrapped ice cream type and/or of the ice cream type on a stick.

An apparatus according to the invention is configured for automatically performing a method according to the invention.

What is claimed is:

1. A method for boxing products comprising an operating sequence, said operating sequence comprising the steps of:
   storing in a storage zone a predetermined number of products to be boxed;
   after said storage step, picking up the products from respective starting positions in the storage zone using a plurality of boxing elements; and
   placing the products picked up into a box using said boxing elements;
   the step of storing products in the storage zone comprising moving a plurality of storage elements from a receiving zone for receiving the products to said storage zone, each of said storage elements being configured to transport a respective product present in the respective storage element;
   for each step of moving the plurality of storage elements, monitoring a presence or absence of a respective product in each storage element moved;
   automatically determining for each product to be boxed a respective storage position of the product to be boxed in the storage zone depending on the presence or absence of respective products in the respective storage elements;
   automatically setting up, for each boxing element, the respective starting position of the respective boxing element as a function of the determined storage position for the respective product to be boxed.

2. The method for boxing products according to claim 1, wherein each of said boxing elements is movable with respect to the storage zone, mechanically independently from the other boxing elements, such that said step of automatically setting up is performed by automatically controlling the starting position of each of the boxing elements at least partly independently from that of the other boxing elements.

3. The method for boxing products according to claim 1, wherein:
   for each step of moving the plurality of storage elements, the plurality of storage elements is a row of storage elements and the respective movement step occurs by translation along the direction of extension of the row;
   the setting up step is performed, for each boxing element, by automatically selecting the respective location of the respective boxing element along a longitudinal direction parallel to said direction of extension, the respective selected location of each boxing element corresponding to the respective location along the direction of extension of the position obtained of the respective product to be boxed.

4. The boxing method according to claim 3, wherein:
   said boxing elements are mechanically movable independently from one another along a shared support oriented at least mainly along said longitudinal direction;
   for each boxing element, the respective location is a location along said shared support; and
   said picking up the products from respective starting positions in the storage zone is performed using a first movement of said shared support, said first movement of the shared support comprising a component along a second direction transversal to said longitudinal direction and said boxing elements being integral with said first movement.

5. The boxing method according to claim 4, wherein said placing the products picked up into the box is performed by a second movement of said shared support, said second movement comprising a component along a third direction transversal to said first direction and second direction and said boxing elements being integral with said second movement.

6. The boxing method according to claim 5, wherein a number of the storage elements is different from said predetermined number of products to be boxed.

7. The boxing method according to claim 1, wherein said monitoring the presence or absence of the respective product is performed by a sensor operating between said receiving zone and storage zone.

8. The method for boxing products according to claim 1, comprising performing repeatedly and sequentially said operating sequence, wherein, for each repetition, the automatically setting up is performed to keep constant the number of boxed products from one repetition to another, with variations in the presence or absence of respective products in the storage elements.

9. An apparatus for boxing products comprising:
   a storage unit for storing a predetermined number of products to be boxed in a storage zone;
   a boxing unit comprising a plurality of boxing elements, said boxing unit being configured so that each of said boxing elements, starting from a respective starting position with respect to said storage zone, picks up and boxes a respective product to be boxed;
   said storage unit comprising a plurality of storage elements, each is configured to move said products to be boxed from a receiving zone for the products to said storage zone, each of said storage elements being configured to transport a respective product present in the respective storage element;
   a monitoring unit that automatically monitors a presence or absence of a respective product in each storage element being moved from the receiving zone to the storage zone;
   a determining module configured to automatically determine, for each product to be boxed, a respective storage position of the respective product to be boxed in the storage zone depending on the presence or absence of respective products in the respective storage elements;
   a setting up unit configured to automatically set up, for each boxing element, the starting position of the respective boxing element as a function of the storage position determined of the respective product to be boxed.

10. The boxing apparatus according to claim 9, wherein the setting up unit is configured for moving each of said boxing elements with respect to said storage zone, mechanically independently from the other boxing elements to automatically control the starting position of each of the boxing elements at least partly independently from that of the other boxing elements.

11. The boxing apparatus according to claim 9, wherein:
said storage elements define a row of storage elements;
said storage elements are configured to move from said receiving zone to said storage zone, by translation along a direction of extension of the row;
said boxing unit comprises a shared support that supports the boxing elements, the shared support being oriented at least mainly along a longitudinal direction parallel to said direction of extension;
the setting up unit is configured to automatically set up the respective starting position of each boxing element, and each boxing element is configured to move along said shared support mechanically independently from the other boxing elements;
the boxing unit is configured to cause a first movement of the support such that the boxing elements pick up the respective products to be boxed by at least said first movement, said first movement comprising at least one component along a second direction transversal to said longitudinal direction;
the boxing unit is further configured to cause a second movement of the shared support such that the boxing elements box the respective products picked up by at least said second movement, said second movement comprising at least one component along a third direction transversal to said first direction and second direction.

12. The boxing apparatus according to claim 11, wherein said monitoring unit comprises a sensor positioned between said receiving zone and said storage zone for detecting the presence or absence of the respective product in each storage element.

* * * * *